US007609975B2

(12) United States Patent
Hashimoto et al.

(10) Patent No.: US 7,609,975 B2
(45) Date of Patent: Oct. 27, 2009

(54) OPTICAL TRANSMISSION APPARATUS

(75) Inventors: Chikashi Hashimoto, Kawasaki (JP);
Yoshihisa Ikeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 511 days.

(21) Appl. No.: 11/646,565

(22) Filed: Dec. 28, 2006

(65) Prior Publication Data

US 2008/0056712 A1    Mar. 6, 2008

(30) Foreign Application Priority Data

Aug. 29, 2006   (JP)   ............... 2006-232469

(51) Int. Cl.
*H04B 10/00* (2006.01)
*H04B 10/04* (2006.01)
*H04B 10/08* (2006.01)

(52) U.S. Cl. .......... 398/164; 398/158; 398/33; 398/192; 398/194

(58) Field of Classification Search ......... 398/25, 398/33, 34, 93, 94, 136, 177, 192, 194, 104, 398/105, 158, 164
See application file for complete search history.

(56) References Cited

U.S. PATENT DOCUMENTS 6,687,466 B1 *  2/2004  Chiappetta ............ 398/193

6,795,657 B1 *  9/2004  Nakano ................. 398/202

FOREIGN PATENT DOCUMENTS

| JP | 60-186138 | 9/1985 |
|---|---|---|
| JP | 6-61985 | 3/1994 |

* cited by examiner

*Primary Examiner*—Dalzid Singh
(74) *Attorney, Agent, or Firm*—Staas & Halsey LLP

(57) ABSTRACT

In an optical transmission apparatus controlling an optical output portion by a working optical output controller and a protection optical output controller, the optical output controllers separately generate (inverted) preset value signals corresponding to a common output preset value provided from outside, and perform an analog addition of a common optical output monitoring signal and the preset value signal with an integrating circuit. An optical output portion generates an optical output signal which is an optical input signal controlled based on an output of the wired-OR of the optical output controllers, and generates the optical output monitoring signal corresponding to the optical output signal. When the optical output monitoring signal exceeds the preset value signals, the optical output controllers substantially control input terminals of the integrating circuits respectively to a ground potential by using control circuits.

6 Claims, 11 Drawing Sheets

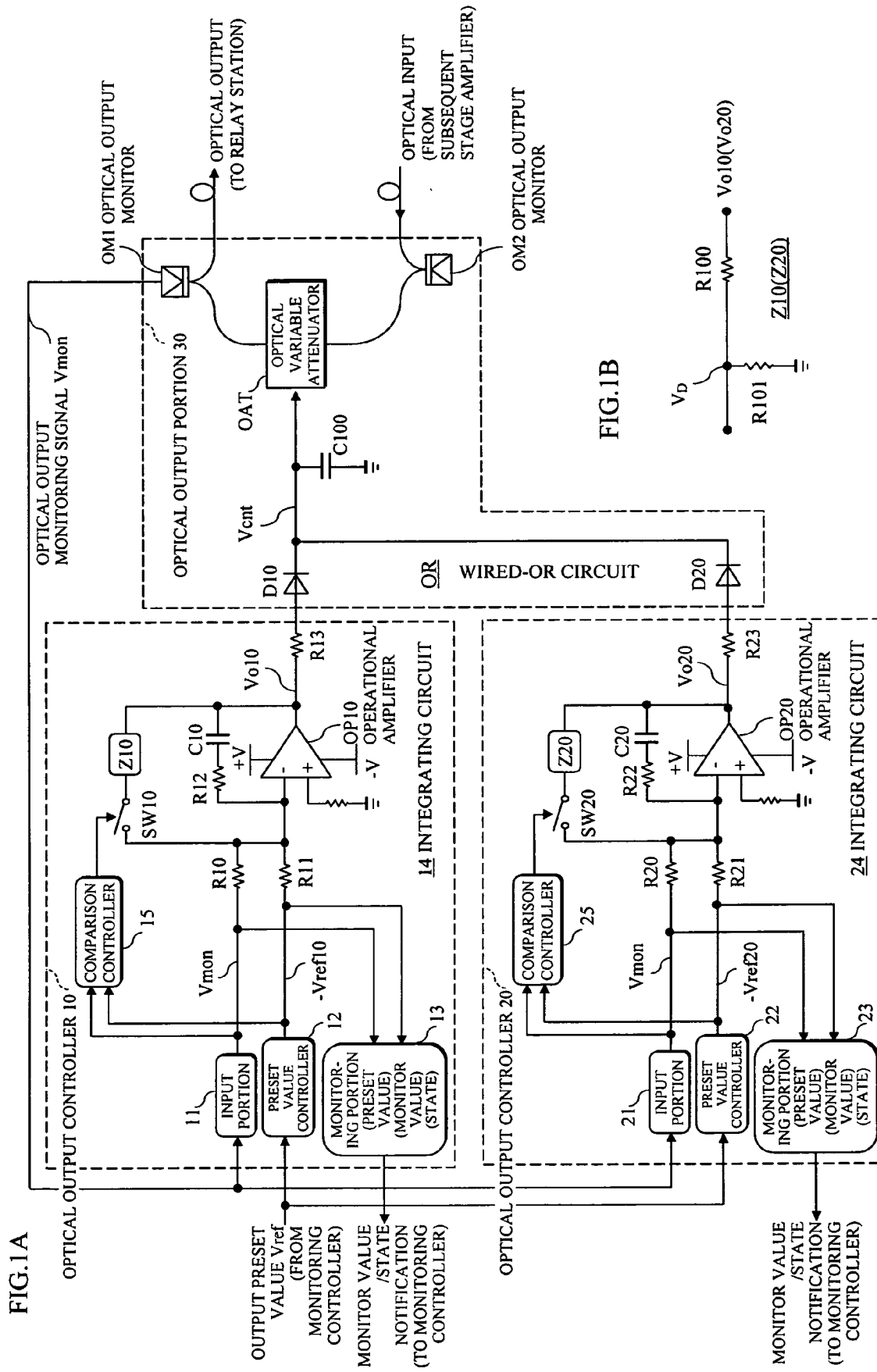

FIG.2A
PRIOR ART
FIG.2B
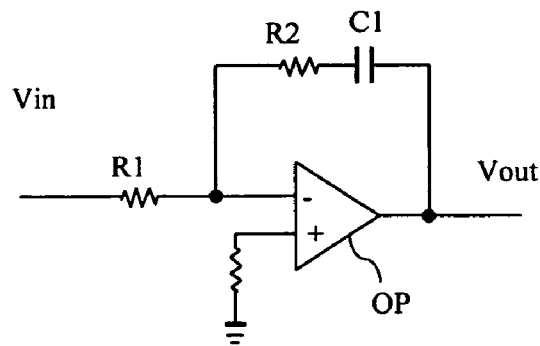
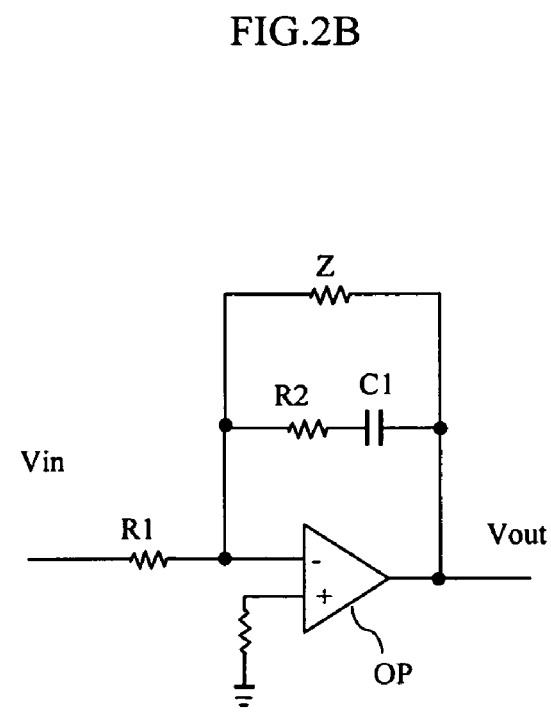

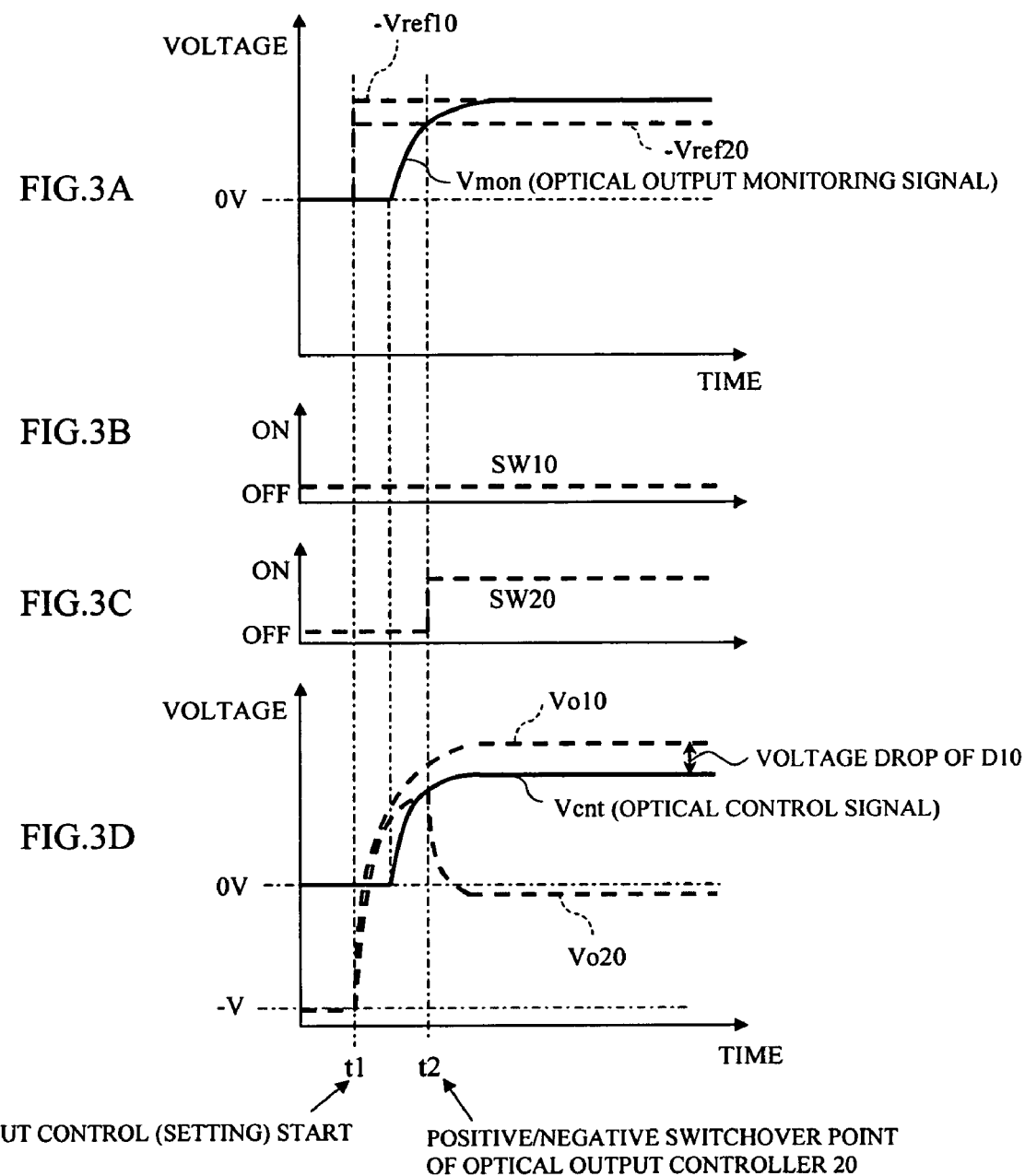

OPTICAL TRANSMISSION APPARATUS

BACKGROUND OF THE INVENTION

1. Field of the Invention

The present invention relates to an optical transmission apparatus, and in particular to an optical transmission apparatus having a redundant configuration provided on an output side of a submarine optical terminal.

2. Description of the Related Art

FIG. 6 shows a general system configuration of a submarine optical terminal, where an optical multiplexer 1 multiplexing optical signals having wavelengths λ1-λn of n-wave, a preceding stage amplifier 2 amplifying optical signals outputted from the optical multiplexer 1, a dispersion compensating fiber 3 inserted into an optical fiber transmission line so as to cancel a wavelength dispersion on the transmission line for the optical signals amplified by the preceding stage amplifier 2, a subsequent stage amplifier 4 further amplifying optical signals outputted from the dispersion compensating fiber 3, and an optical transmission apparatus 5 transmitting the optical signals amplified by the subsequent stage amplifier 4 to an adjoining relay station are all connected in series. The preceding stage amplifier 2, the subsequent stage amplifier 4, and the optical transmission apparatus 5 are interconnected to a monitoring controller 6.

The optical transmission apparatus 5 in this system configuration is composed of an optical output controller and an optical output portion. The optical output controller has a redundant configuration of a working optical output controller 10 and a protection optical output controller 20, and controls an optical output portion 30 common to both of the controllers. Thus, a redundant configuration of the optical output controller stabilizes the system, and the optical output portion comprising elements whose failure rate is low enhances reliability.

FIG. 7 shows a prior art arrangement of the above-mentioned optical transmission apparatus 5, where this arrangement shows only one of the optical output controllers 10 and 20 as representatively indicated by a reference numeral "0" and the optical output portion 30, for the sake of simplifying the description.

Firstly, the optical transmission apparatus 5 performs a (negative) feedback control including the optical output portion 30 in order that the optical output controller 0 keeps its optical output level fixed and stable.

The optical output controller 0 is composed of an input portion 1 for inputting an optical output monitoring signal Vmon fed back from the optical output portion 30 and for taking out only the DC component thereof, a preset value controller 2 for performing a D/A conversion and an inversion to an output preset value Vref provided from the monitoring controller 6 and for outputting an inverted preset value signal −Vref, a monitoring portion 3 for performing a monitor value/state notification to the monitoring controller 6, an integrating circuit 4 connected to the input portion 1, the preset value controller 2, and the monitoring portion 3, and an output resistor R3 serially connected to the output side of the integrating circuit 4.

Also, the integrating circuit 4 is composed of an operational amplifier OP, input resistors R0 and R1 one ends of which are commonly connected to an inverting input terminal of the operational amplifier OP and the other ends of which are respectively connected to the input portion 1 and the preset value controller 2, and a resistor R2 and a capacitor C1 serially connected between the inverting input terminal and the output terminal of the operational amplifier OP and composing a feedback circuit. A non-inverting input terminal of the operational amplifier OP is grounded through a resistor. It is to be noted that the monitoring portion 3 is connected to the output terminals of the input portion 1 and the preset value controller 2 so that the output signals may be transmitted to the monitoring controller 6 to be monitored.

The optical output portion 30 is composed of a diode D0 connected to the output resistor R3 of the optical output controller 0 and receiving an optical control signal Vcnt, an optical variable attenuator OAT connected to the diode D0, an optical output monitor OM2 monitoring an optical input from the subsequent stage amplifier 4 shown in FIG. 6 and providing the optical input to the optical variable attenuator OAT, and an optical output monitor OM1 outputting optical signals outputted from the optical variable attenuator OAT to a relay station and generating the optical output monitoring signal Vmon. The input terminal of the optical variable attenuator OAT is grounded through a coupling capacitor C100.

FIGS. 8A and 8B show operation waveforms upon output setting of the optical output controller 0 in the optical transmission apparatus 5. It is to be noted that +V and −V indicate a power supply voltage of the operational amplifier OP.

Firstly, the operation principle of the integrating circuit 4 including the operational amplifier OP will now be described. As shown in FIG. 2A, a transfer function G of the integrating circuit in this case can be expressed by the following Eq. (1):

$$G = \frac{Vout}{Vin} = \frac{-\left(R2 + \frac{1}{j\omega C}\right)}{R1} = \frac{-\omega CR2 + j}{\omega CR1} \qquad \text{Eq. (1)}$$

Accordingly, the gain can be provided by the following Eq. (2):

$$|G| = \frac{\sqrt{1 + (\omega CR2)^2}}{\omega CR1} \qquad \text{Eq. (2)}$$

Thus, the AC gain can be expressed by the following Eq. (3):

$$|G| = \frac{R2}{R1} \qquad \text{Eq. (3)}$$

When the integrating circuit has two input resistors R0 and R1 as shown in FIG. 7, the output voltage Vout of the operational amplifier OP can be provided by the following Eq. (4):

$$Vout = \frac{R2}{R0}(Vmon) + \frac{R2}{R1}(Vref) \qquad \text{Eq. (4)}$$

If R0, R1, and R2 are equal to each other (R0=R1=R2) in the above-mentioned Eq. (4), the output voltage Vout of the operational amplifier OP assumes Vmon+Vref.

Since the output voltage Vref from the monitoring controller 6 is provided to the resistor R1 as a signal−Vref D/A converted and inverted by the preset value controller 2, a negative feedback control is performed so as to assume Vout=−Vref+Vmon. Namely, when the optical output portion 30 is controlled to the output preset value Vref, a control is performed to the optical output portion 30 so that the output voltage Vout of the operational amplifier OP may assume Vmon=Vref.

This will be specifically described referring to operation waveforms of FIGS. 8A and 8B. Before a start time t1 of the output setting or control from the monitoring controller 6, the output −Vref of the preset value controller 2 assumes "0" as shown in FIG. 8A. It is to be noted that in FIGS. 8A and 8B, the polarity of −Vref is shown in inverted form for easy contrast to Vmon.

Since the optical output of the subsequent stage amplifier 4 is already set at this time, the optical input to the optical output monitor OM2 in the optical output portion 30 exists, and since a faint signal exists at the output of the optical variable attenuator OAT, the optical output monitoring signal assumes Vmon>0. Thus, −Vref(=0)+Vmon>0 is obtained, the output Vout of the operational amplifier OP before the output control (setting) start from the monitoring controller 6 is amplified up to the negative power supply voltage −V and stabilized as shown in FIG. 8B.

When the output control (setting) is started from the monitoring controller 6 at a time of t1 thereafter, the preset value controller 2 outputs the inverted preset value signal −Vref, and the operational amplifier OP controls the output Vout so as to obtain −Vref+Vmon=0, as shown in FIG. 8A. When −Vref+Vmon=0 is obtained, the output Vout can be obtained in a stable form. At this time, the optical control level Vcnt assumes the level of the output preset value Vref However, since the diode D0 is provided on the output side of the operational amplifier OP, a stable output is to be generated in the form of being dropped by the voltage drop from the output voltage Vout of the optical output controller 0.

While the above-mentioned optical transmission apparatus 5 in FIG. 7 has been shown as the series circuit of the single optical output controller 0, and the optical output portion 30, the optical transmission apparatus in FIG. 9 corresponds to the actual redundant configuration shown in FIG. 6. Namely, the output terminals of the two optical output controllers 10 and 20 are interconnected through the wired-OR circuit OR in the optical output portion 30 and connected to the optical variable attenuator OAT.

It is to be noted that the configurations of the optical output controllers 10 and 20 are the same as those of the optical output controller 0 shown in FIG. 7. However, in order to mutually distinguish the optical output controller 10 and the optical output controller 20, the input portion is shown as e.g. an input portion 11 in the optical output controller 10 and likewise the other parts are shown with "10" being added to the reference numerals of the optical output controller 0 in FIG. 7. Similarly, in the optical output controller 20, "20" is added to the reference numerals of the optical output controller 0 in FIG. 7, as shown by the input portion 21, which is the only different point from the optical output controller 0 in FIG. 7. Since the optical output monitoring signal Vmon which is a feedback signal is common to the optical output controllers 10 and 20, the same reference numeral is used.

Also, in the wired-OR circuit OR, the output terminals of diodes D10 and D20 respectively connected to the output resistors R13 and R23 of the optical output controllers 10 and 20 are mutually connected, so that the optical control signal Vcnt assumes a wired-OR signal of the output Vo10 of the operational amplifier OP10 and the output Vo20 of the operational amplifier OP20 to be provided to the optical variable attenuator OAT.

The operation upon output control (setting) of the optical transmission apparatus 5 will now be described referring to the waveforms of FIGS. 10A and 10B.

Firstly, since −Vref+Vmon>0 before the output control (setting) start time t1 of the monitoring controller 6 as mentioned above, the output voltages Vo10 and Vo20 respectively of the operational amplifiers OP10 and OP20 are amplified up to the negative power supply voltage −V and stabilized as shown in FIG. 10B.

When a common output preset value Vref is provided to the optical output controllers 10 and 20 from the monitoring controller 6, preset value controllers 12 and 22 respectively output inverted preset value signals −Vref10 and −Vref20. The reason why two inverted preset value signals −Vref10 and −Vref20 may be generated is because the D/A conversion and the polarity inverting operation in the preset value controllers 12 and 22 are separately performed. The operational amplifiers OP10 and OP20 control their output voltages Vo10 and Vo20 so that −Vref10+Vmon=0 and −Vref20+Vmon=0 by the respective controls.

In case of a relationship of −Vref10<−Vref20 (reverse relationship for absolute values) as shown in FIG. 10A, it is obtained that (−Vref10+Vmon)<(−Vref20+Vmon). As a result, the relationship between the output voltages Vo10 and the Vo20 is inverted by the inversion amplifying function of the operational amplifier, which leads to Vo10>Vo20 as shown in FIG. 10B.

The optical control signal Vcnt to the optical variable attenuator OAT assumes a wired-OR value by the diodes D10 and D20 of the output voltages Vo10 and Vo20. Therefore, in the above-mentioned example, the optical control signal Vcnt follows the level of the output voltage Vo10 whose voltage value is high, and the optical variable attenuator OAT is controlled to a fixed optical level by the optical output controller 10.

While at this time the optical output controller 10 performs the control so as to obtain −Vref10+Vmon=0, and similarly performs the control so as to obtain −Vref20+Vmon=0, the output voltage Vo20 of the operational amplifier OP20 in the optical output controller 20 after a time t2 of −Vref20≦Vmon is kept being controlled so as to output a negative voltage as shown in FIG. 10B due to −Vref10<−Vref20 as mentioned above, so that the output negative voltage Vo20 assumes the negative power supply voltage −V.

It is to be noted that there has been proposed an automatic optical output control circuit in which a temperature state of a protection LD is detected by a temperature sensor of an automatic optical output control APC circuit, and its output is connected to an analog amplifier through a gate circuit controlled by an LD prebias control signal. When the temperature of an LD varies in a normal APC loop, the amplifier varies the output voltage of the sensor so as to equalize with an output variation width of an analog amplifier compensating a variation of an optical output by controlling an LD DC bias current. The output of the amplifier is connected to the base of a transistor through the transistor and a DC bias current suitable for the temperature state of the LD is flowed even if the output voltage of the amplifier drops at the time of no-signal. Thus, a pulse modulation characteristic of a protection LD can be obtained at the time of an LD switchover without delay of the light emission (see e.g. patent document 1).

Also, in a redundant system which has a 0 system device and a 1 system device for a single or a plurality of devices, and which executes processing e.g. a clock signal by using a clock signal selected and outputted by a selector of each device, there has been proposed a redundant system switchover control method having switchover settlement controllers which mutually transfer state information such as a switchover control state, receive state information of an alarm signal or the like from the device, output a switchover control signal based on state information of its own system and the other system and state information of the alarm signal or the like of the device to be provided to the selector of the device through a switchover control signal line, and the selector performing a system switchover between the 0 system device and the 1 system device corresponding to the switchover control signal of both systems (see e.g. patent document 2).

[Patent document 1] Japanese Patent Application Laid-open No. 60-186138

[Patent document 2] Japanese Patent Application Laid-open No. 6-61985

In the above-mentioned prior art, when e.g. the optical output controller 10 is switched over to the optical output controller 20 due to a unit failure and a unit mounting omission, there has been a problem that the optical output monitoring signal Vmon largely varies as follows:

When such a unit failure or mounting omission occurs in the optical output controller 10 during the optical output control (in the working system) so that the control is disabled, as shown by the operation waveform upon the optical output controller switchover of FIG. 11B, the output voltage Vo10 is dropped from a time t11, followed by the drop of the optical control level Vcnt, and further followed by the drop of the optical output monitoring level Vmon as shown in FIG. 11A. At a time t12 of −Vref20=Vmon, the output voltage Vo20 of the operational amplifier OP20 begins to rise, whereby the optical control level Vcnt is controlled.

However, there has been a problem that the actual optical control signal Vcnt largely varies as shown in FIG. 11B since a time period up to a time t13 of Vo20>Vo10 is required in order to obtain the output voltage Vo20 of the optical output controller 20=optical control signal Vcnt.

SUMMARY OF THE INVENTION

It is accordingly an object of the present invention to provide an optical transmission apparatus controlling an optical output portion with a working optical output controller and a protection optical output controller, thereby suppressing an output variation upon switchover between a working system and a protection system.

In order to achieve the above-mentioned object, an optical transmission apparatus according to one aspect of the present invention comprises: a first and second optical output controllers respectively including a preset value controller generating a preset value signal corresponding to a common output preset value provided from outside, and an integrating circuit having input terminals for performing an analog addition of a common optical output monitoring signal and the preset value signal; and an optical output portion connecting output signals of the optical output controllers in form of a wired-OR, generating an optical output signal which is an optical input signal controlled based on an output of the wired-OR, and generating the optical output monitoring signal corresponding to the optical output signal; each optical output controller further comprising a control circuit substantially controlling the input terminal of the integrating circuit to a ground potential when the optical output monitoring signal exceeds the preset value signal.

Namely, when a control for an optical output portion is performed by an integrating circuit in a working optical output controller in the present invention, if the integrating circuit is normal and an optical output monitoring signal corresponding to an optical control signal for the optical output portion is in a normal state, the optical output portion is controlled so as to coincide with a preset value signal corresponding to the output preset value. The output signal levels of the optical output controllers provide a wired-OR signal in the optical output portion, without exerting mutual influences.

Since the preset value signal to the integrating circuit from the protection preset value controller does not exceed the level of the above-mentioned optical output monitoring signal, the corresponding control circuit controls an input terminal of the protection integrating circuit to substantially a ground (zero) potential. Namely, when the working optical output controller controls the optical output level, the optical output level control for the protection optical output controller is performed so as not to be stuck to a negative power supply voltage but to the ground potential.

When a failure or the like occurs in the working integrating circuit, the level of the optical output monitoring signal correspondingly drops, becoming equal to or less than the preset value signal for the protection integrating circuit, the control circuit corresponding thereto now operates the protection integrating circuit as a working integrating circuit. Since the then output of the protection integrating circuit is not raised from the negative power supply voltage but from a substantial ground potential, the switchover to the output level of the integrating circuit failed is quickly performed.

Accordingly, even if an inverted preset value signal obtained by e.g. a D/A conversion function and an inversion function by the preset value controller in each optical output controller is varied, a drop of the optical output monitor level is reduced.

The above-mentioned integrating circuit may be composed of a feedback circuit including a first resistor and a capacitance, and an operational amplifier having a second and third resistors respectively inputting the optical output monitoring signal and the preset value signal for performing the analog addition with the first resistor.

Also, the above-mentioned optical output portion may be composed of a wired-OR circuit comprising a first and second diodes which respectively input output signals of the first and second optical output controllers to be outputted to a common connection point, an optical variable attenuator generating the optical output signal which is the optical input signal attenuated corresponding to the output signal of the common connection point, and a monitoring portion generating the optical output monitoring signal from the optical output signal generated from the optical variable attenuator.

Also, each of the above-mentioned control circuits may be composed of a comparison controller comparing the optical output monitoring signal with the preset value signal, a switch closed by the comparison controller only when the optical output monitoring signal exceeds the preset value signal, and an impedance circuit which composes a series circuit with the switch and which compulsorily drops the input terminal of the integrating circuit to a ground potential when the switch is closed, and the series circuit of the switch and the impedance circuit may be connected in parallel with the feedback circuit.

Furthermore, the above-mentioned impedance circuit may comprise a resistance voltage-dividing circuit connected between an output terminal of the operational amplifier and the ground potential, and a voltage diving point thereof may be connected to the switch and may be set substantially close to the ground potential.

As mentioned above, according to the optical transmission apparatus according to the present invention, an output variation upon switching over a working integrating circuit (optical output controller) to a protection integrating circuit in a redundant configuration is enabled only by adding a simple control circuit to optical output controllers, thereby realizing a quick and safe switchover between the working system and the protection system.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIGS. 1A and 1B are circuit block diagrams showing one embodiment of an optical transmission apparatus according to the present invention;

FIGS. 2A and 2B are diagrams of an equivalent circuit for illustrating an operation principle of an integrating circuit used for the prior art example and the present invention;

FIGS. 3A-3D are operation waveform diagrams upon output setting in an optical transmission apparatus according to the present invention;

DESCRIPTION OF THE EMBODIMENTS

Hereinafter, embodiments of an optical transmission apparatus according to the present invention will be described by referring to attached figures.

Figure 9:
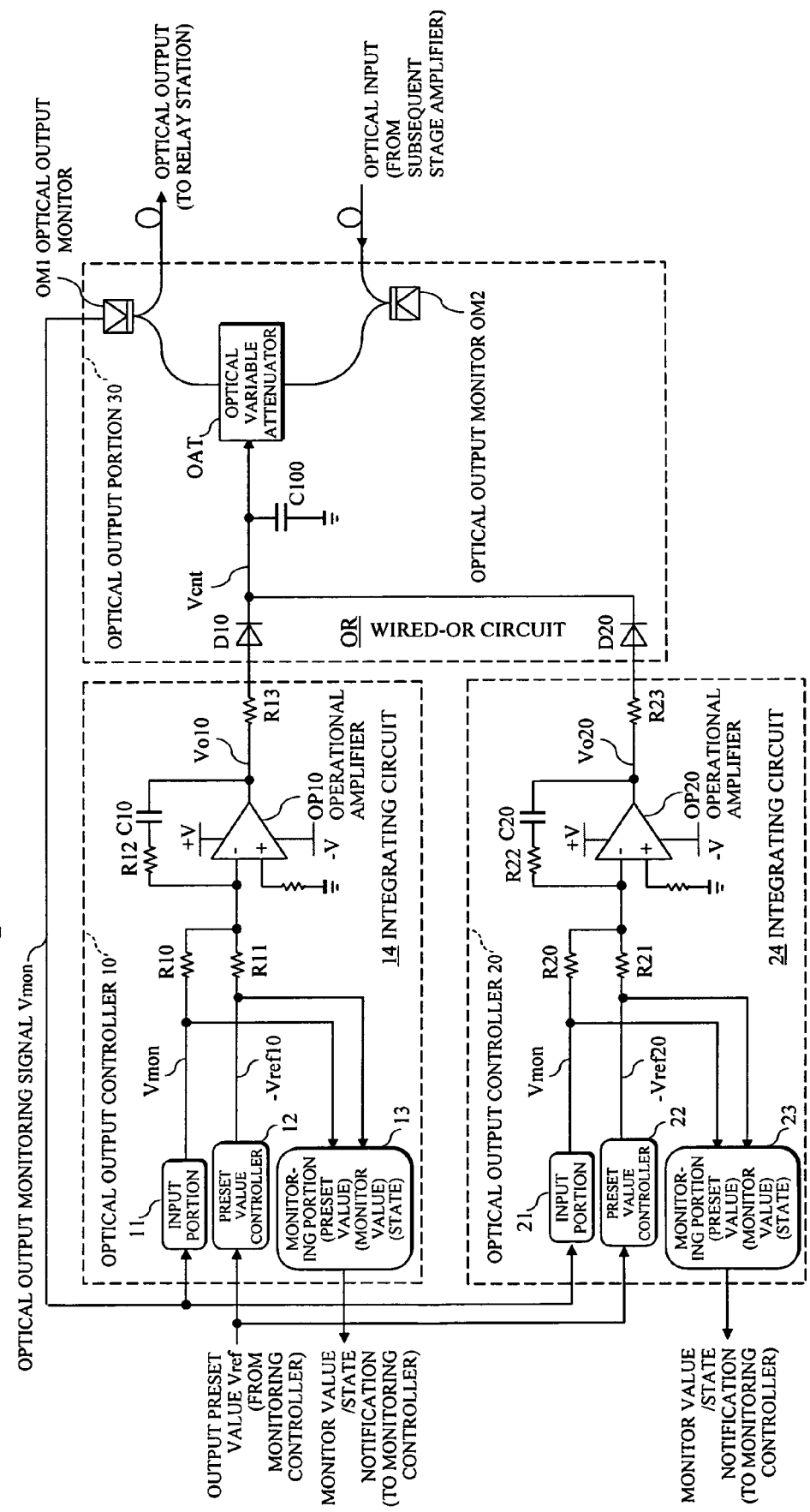
FIG. 9 is a circuit block diagram showing a prior art optical transmission apparatus (optical output controller is an actual redundant configuration)

FIG. 1A shows an embodiment of an optical transmission apparatus according to the present invention. This embodiment is different from that of the prior art example shown in FIG. 9 in that comparison controllers 15 and 25, switches SW10 and SW20, as well as impedance circuits Z10 and Z20 are additionally provided.

In the optical output controller 10 of this embodiment, the comparison controller 15 is connected so as to receive output signals of the input portion 11 and the preset value controller 12 to control the switch SW10. The switch SW10 is serially connected to the impedance Z10 to compose a feedback circuit of the operational amplifier OP10. Similarly, in the optical output controller 20, the comparison controller 25 receives the output signals of the input portion 21 and the preset value controller 22, controls the switch SW20, which is serially connected to the impedance circuit Z20 to compose a feedback circuit of the operational amplifier OP20.

It is to be noted that both of the impedance circuits Z10 and Z20 can be composed of resistance voltage-dividing circuits as shown in FIG. 1B. Namely, one end of the switch SW10 or SW20 is connected to the dividing point of the resistance voltage-dividing circuit composed of the resistors R100 and R101, the other end of the resistor R101 is grounded, and the other end of the resistor R100 is connected to the output terminal of the operational amplifier OP10 or OP20. Accordingly, the voltage of the dividing point $V_D = V_O 10$ (or $V_O 20) \cdot R101/(R100+R101)$.

The operation principle of the integrating circuits 14 and 24 in the optical output controllers 10 and 20 will now be described by referring to FIG. 2B.

Firstly, an equivalent circuit at the time when the switches SW10 and SW20 are closed is as shown in FIG. 2B. The transfer function G in this case can be expressed by the following Eq. (5):

$$G = \frac{Vout}{Vin}$$ Eq. (5)

$$= -\frac{1}{R1} \cdot \frac{1}{\frac{1}{R2 + \frac{1}{j\omega C}} + \frac{1}{Z}}$$

$$= -\frac{Z}{R1} \cdot \frac{1 + j\omega CR2}{1 + j\omega C(R2 + Z)}$$

$$= \frac{Z}{R1} \cdot \frac{1 + \omega^2 C^2 R2(R2 + Z) - j\omega CZ}{1 - \omega^2 C^2 (R2 + Z)^2}$$

The gain can be expressed by the following Eq. (6):

$$|G| = \frac{Z}{R1} \cdot \frac{\sqrt{(1 + \omega^2 C^2 R2(R2 + Z))^2 + \omega^2 C^2 Z^2}}{1 - \omega^2 C^2 (R2 + Z)^2}$$ Eq. (6)

Thus, the AC gain can be expressed by the following Eq. (7):

$$|G| = \frac{1}{R1} \frac{R2Z}{(R2 + Z)}$$ Eq. (7)

Also in case of FIG. 2B, two input resistors are connected in the same way as the prior art example. Therefore, the output voltage Vo10 (or Vo20) of the operational amplifier OP is pursuant to the above-mentioned Eq. (4).

In the present invention, however, when the impedance circuits Z10 and Z20 are connected in parallel with the feedback circuits of the operational amplifiers OP10 and OP20 as shown in FIG. 2B, the impedance circuits Z10 and Z20 form voltage-dividing circuits as shown in FIG. 1B, and the resistance of the voltage dividing resistor R101 is set extremely small compared with that of the resistor R100. Accordingly, the voltage dividing point voltage $V_D$ substantially approaches the ground voltage. Therefore, when the switch SW10 or SW20 is closed, the equivalent circuit shown in FIG. 2B is supposed to have the inverting input terminal of the operational amplifier OP10 or OP20 connected to the ground potential. On the other hand, when the switch SW10 or SW20 is opened, the value of the resistor R100 is large, so that there is no substantial influence to the output voltage Vo10 or Vo20 of the operation amplifier OP10 or OP20.

Accordingly, no matter what input voltages are provided to the operational amplifiers OP10 and OP20 in such a case, their output voltages Vo10 and Vo20 assume substantially "0".

According to such an operation principle, the operation waveform upon output setting of the present invention shown in FIGS. 3A-3D will be firstly described.

Figure 10A:
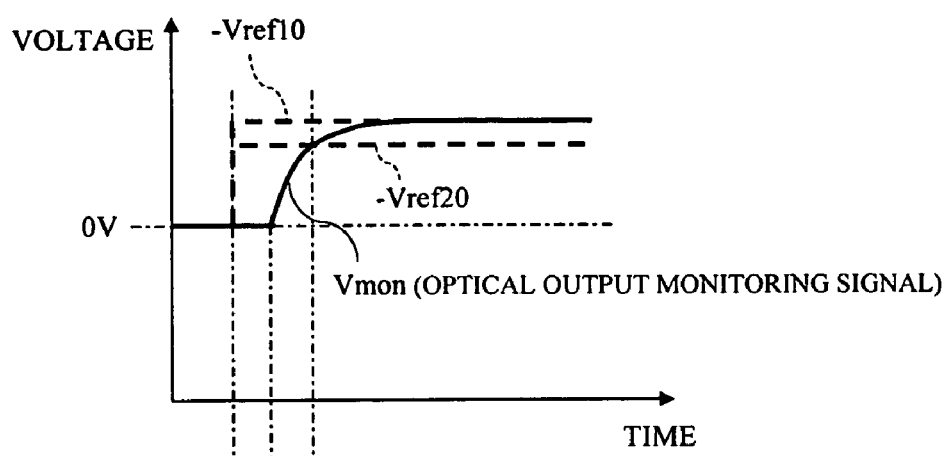
FIGS. 10A and 10B are operation waveform diagrams upon output setting of the prior art example shown in FIG. 9.
Figure 10B:
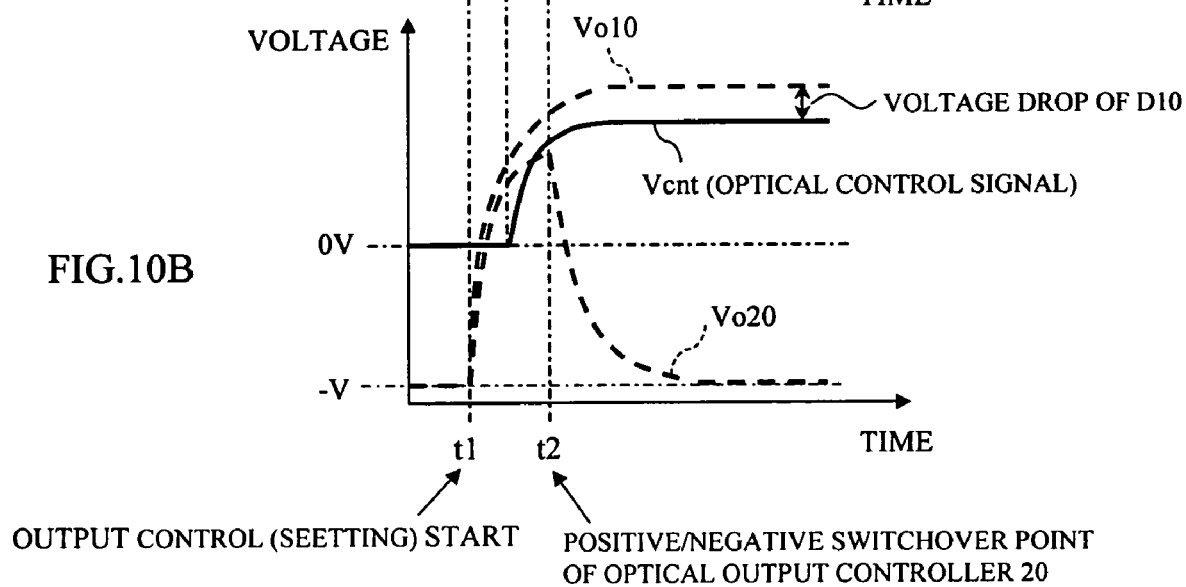
Figure 11A:
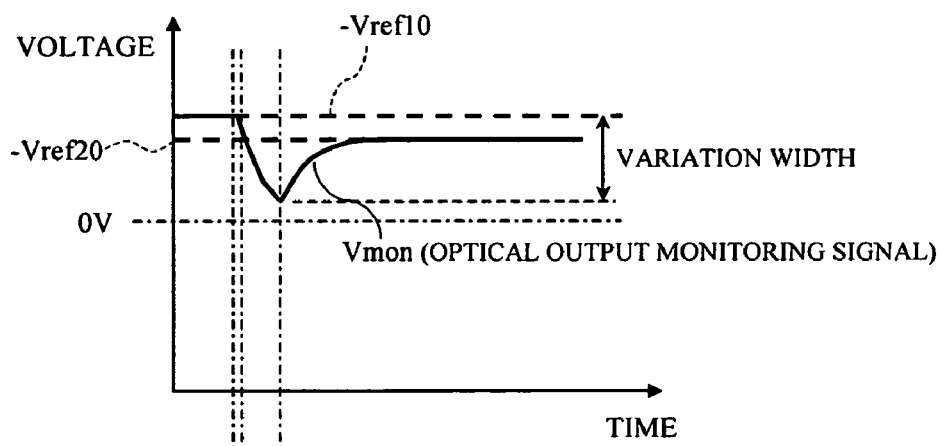
FIGS. 11A and 11B are operation waveform diagrams upon control switchover of the prior art example shown in FIG. 9.
Figure 11B:
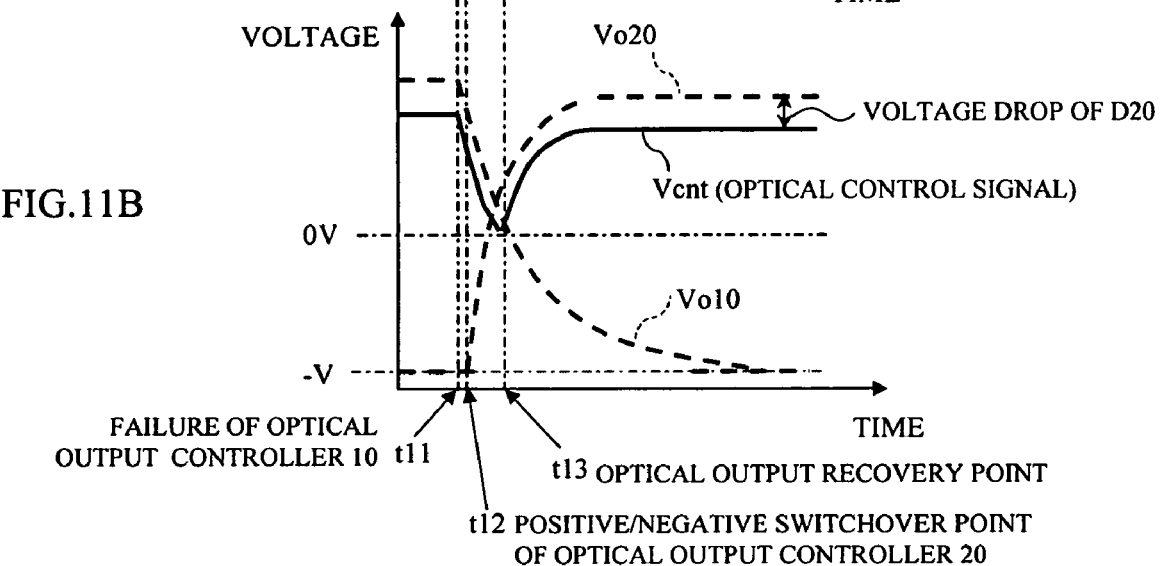

Also upon output setting, in the same way as the prior art example shown in FIGS. 10A and 10B, an inverted preset value signal −Vref10 by the preset value controller 12 in the optical output controller 10 is supposed to be smaller (absolute value is larger) than an inverted preset value signal −Vref20 by the preset value controller 22 in the optical output controller 20 (−Vref10<−Vref20). The switches SW10 and SW20 are made "OFF" (in closed state) as shown in FIGS. 3B and 3C.

Upon receipt of the inverted preset value signals −Vref10, −Vref20, and the optical output monitoring signal Vmon, the output voltages Vo10 and Vo20 of the operational amplifiers OP10 and OP20 start to rise from the negative power supply voltage −V at the time t1 as shown in FIG. 3D, and are followed by the rise of the optical control signal Vcnt, and further followed by the rise of the optical output monitoring signal Vmon. When the optical output monitoring signal Vmon becomes equal to the inverted preset value signal −Vref10, the optical output monitoring signal Vmon is stabilized as shown in FIG. 3A.

Before the optical output monitoring signal Vmon is stabilized in this way, the optical output controller 20 turns the switch SW20 "ON" as shown in FIG. 3C at the time t2 when the optical output monitoring signal Vmon exceeds the inverted preset value signal −Vref20.

By turning the switch SW20 "ON" in this way, the impedance circuit Z20 forms the feedback circuit of the operational amplifier OP20. However, since the voltage dividing resistor R101 has an extremely small value over the resistor R100 as shown in FIG. 1B, the potential $V_D$ of the switch SW20 assumes substantially the ground potential by closing the switch SW20, so that the inverting input terminal of the operational amplifier OP20 approaches the ground potential. Accordingly, the output voltage Vo20 of the operational amplifier OP20, as shown in FIG. 3D, substantially sticks to the vicinity of 0 V after the time t2 of the switchover.

Operations upon switching over from one optical output controller to another will now be described referring to FIGS. 4A-4D.

Figure 4A:
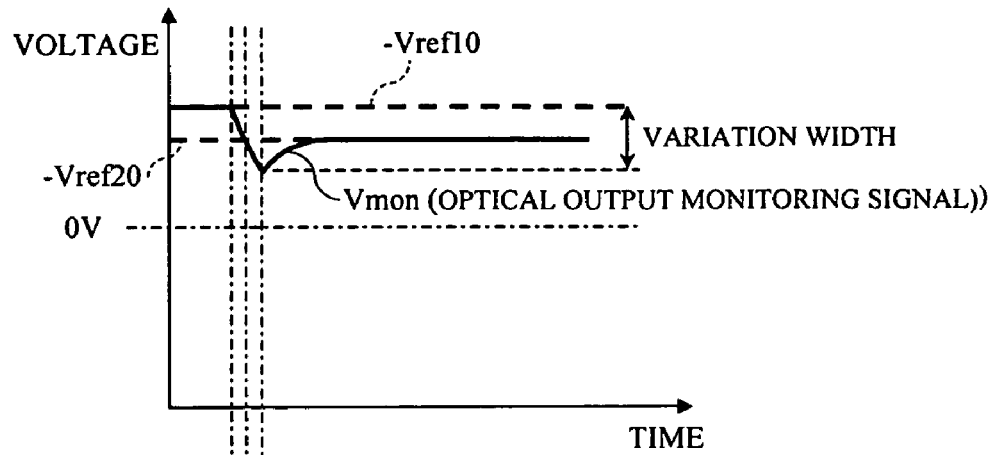
FIGS. 4A-4D are operation waveform diagrams upon control switchover of an optical transmission apparatus according to the present invention.
Figure 4B:
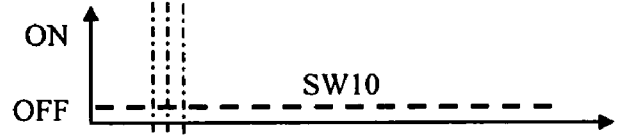
Figure 4C:
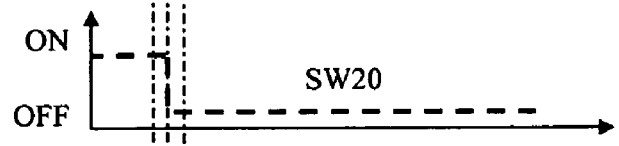
Figure 4D:
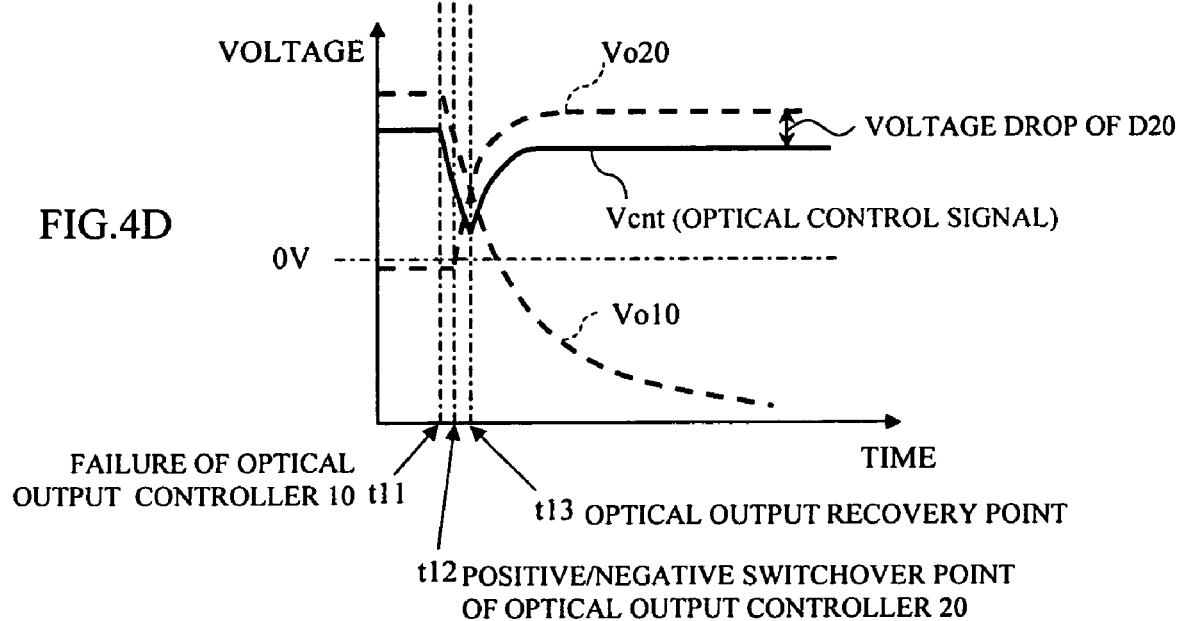

When the output voltage Vo10 of the operational amplifier OP10 drops from the time t11 due to a failure or the like of the working optical output controller 10, the comparison controller 25 turns the switch SW20 "OFF" as shown in FIG. 4C at the time t12 when the optical output monitoring signal Vmon which drops together with the drop of the output voltage Vo10 drops below the inverted preset value signal −Vref20. Thus, the operational amplifier OP20 is separated from the impedance circuit Z20, and switched over to the normal operation. In the presence of the wired-OR circuit OR, the optical output controller 20 is now switched over to a state (working state) controlling the optical output portion 30.

Accordingly, the optical output portion 30 is to be actually controlled at the time t13 of Vo20≧Vo10 or later. Since the output voltage Vo20 of the operational amplifier OP20 substantially starts to rise from the vicinity of 0 V at this time, the variation of the level of the optical control signal Vcnt can be suppressed compared with that of the prior art circuit.

It is to be noted that FIGS. 4A-4D show a case where the switch SW10 is disabled in operation due to a failure or the like of the working optical output controller 10, and the output voltage Vo10 of the operational amplifier OP10 keeps dropping. When the switch SW10 is controllable, the switch SW10 is turned "ON" after the time t11 or later. Therefore, the output voltage Vo10 of the operational amplifier OP10 sticks to the vicinity of 0 V.

Figure 5:
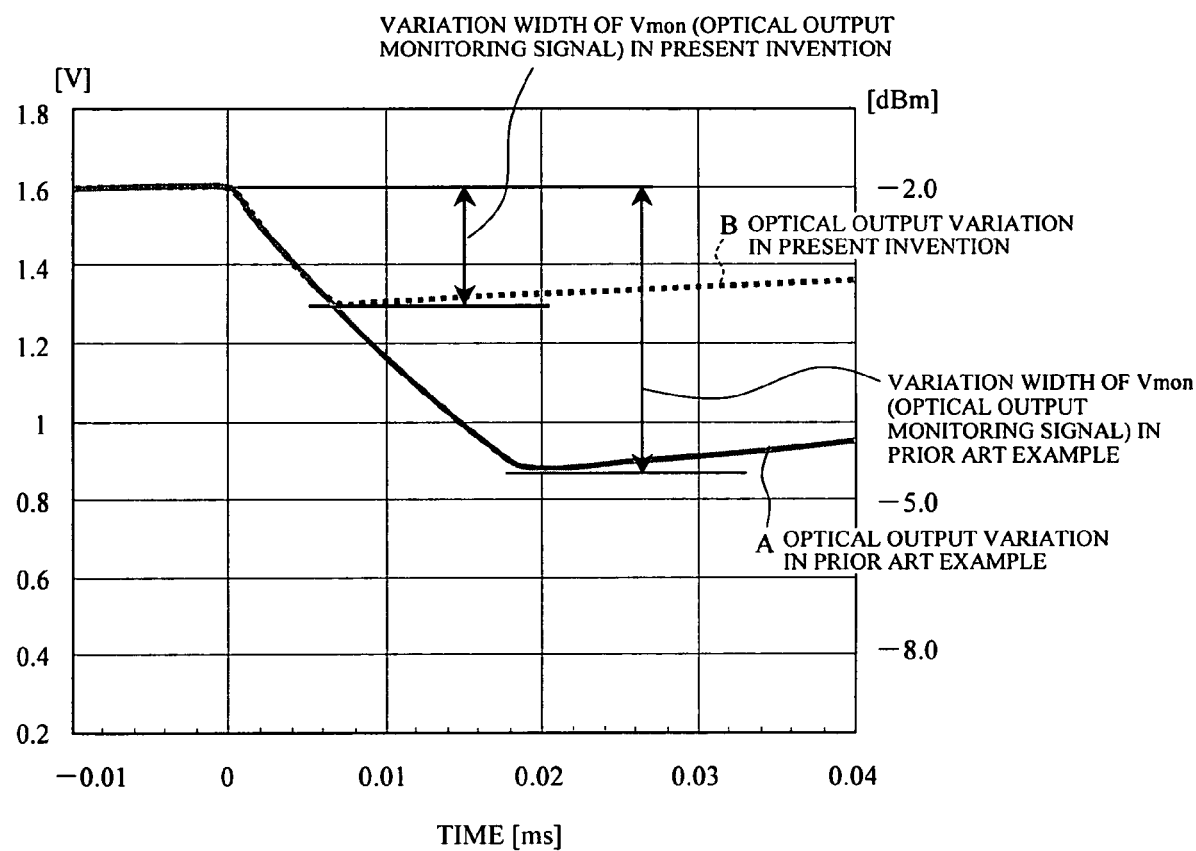
FIG. 5 is a simulation comparison graph of the present invention and the prior art example.
Figure 6:
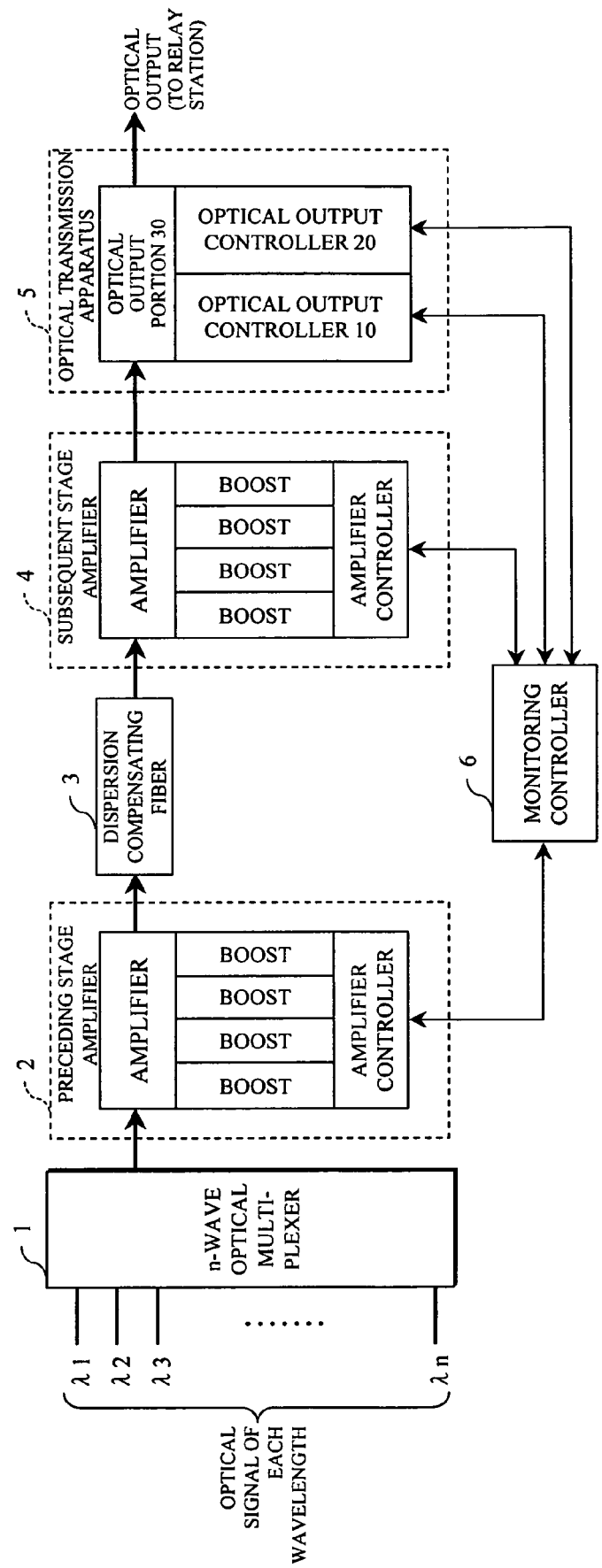
FIG. 6 is a block diagram showing a system arrangement of a submarine optical terminal generally known.
Figure 7:
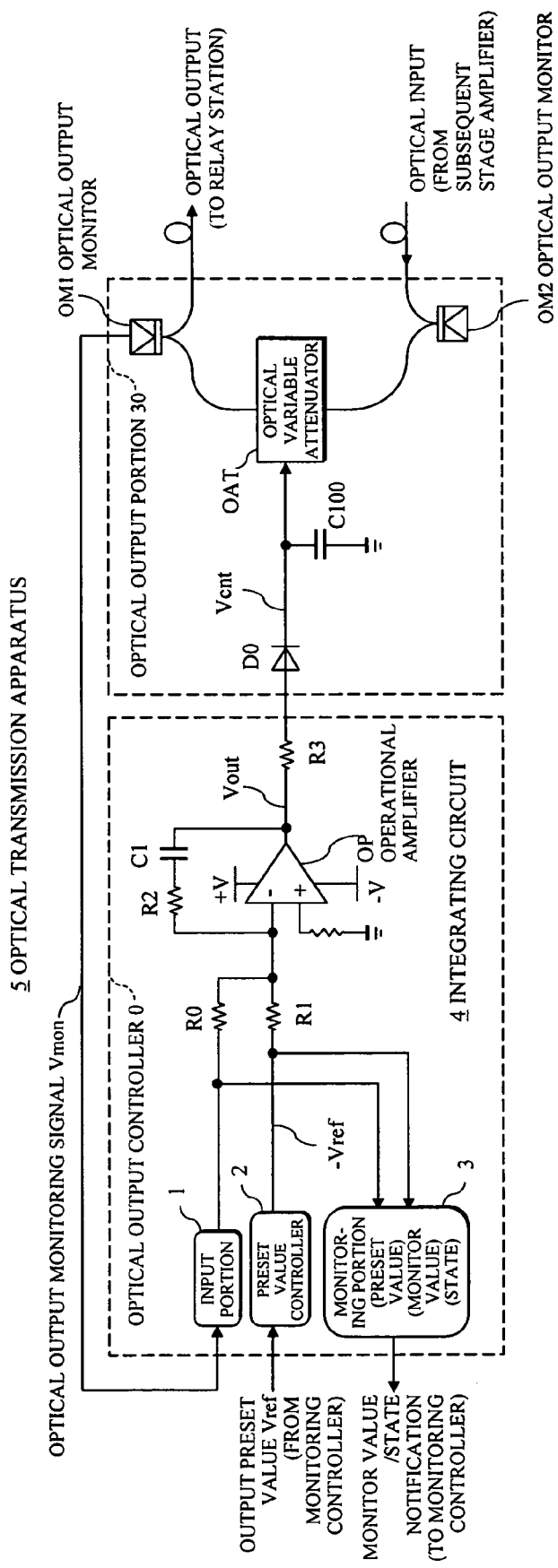
FIG. 7 is a circuit block diagram showing a prior art arrangement (optical output controller is singular) of an optical transmission apparatus.
Figure 8A:
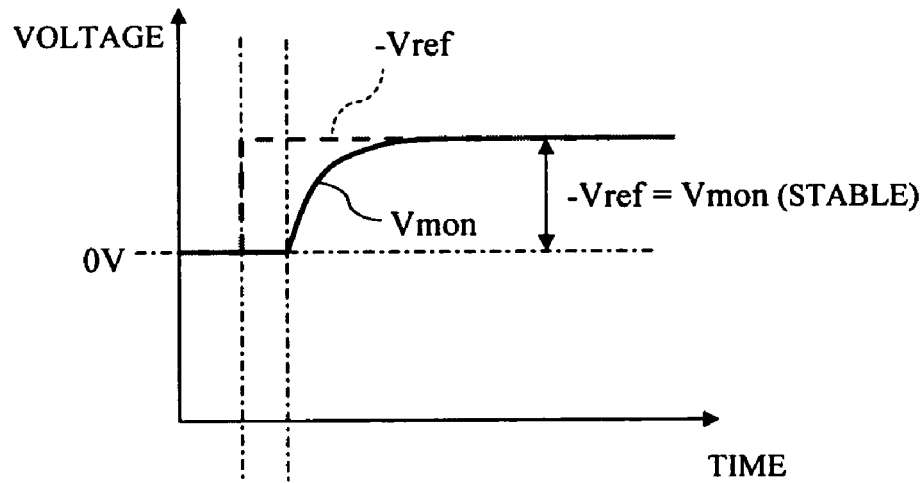
FIGS. 8A and 8B are operation waveform diagrams upon output setting of the optical output controller shown in FIG. 7.
Figure 8B:
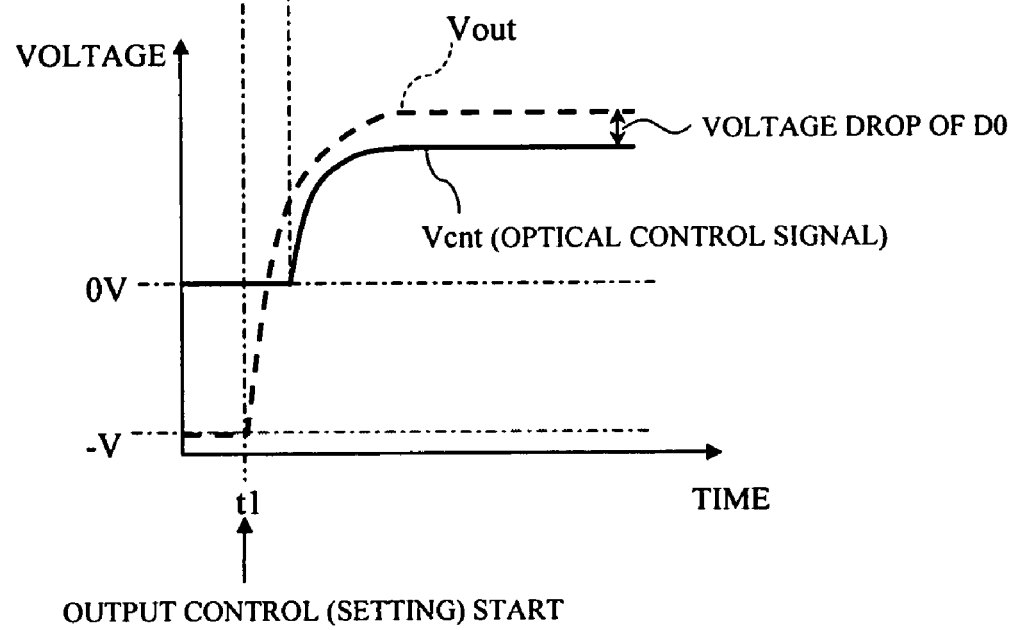

FIG. 5 is a graph showing a result of simulating an optical output variation width of the present invention and the prior art example. An optical output variation characteristic A of the prior art example shown by the solid line is about −0.9 dB compared with an optical output variation curve B of the present invention shown by the dotted line, where it is estimated that about 1.7 dB is improved by the present invention.

It is to be noted that the present invention is not limited by the above-mentioned embodiments, and it is obvious that various modifications may be made by one skilled in the art based on the recitation of the claims.

What is claimed is:

1. An optical transmission apparatus comprising:
a first and second optical output controllers respectively including a preset value controller generating a preset value signal corresponding to a common output preset value provided from outside, and an integrating circuit having input terminals for performing an analog addition of a common optical output monitoring signal and the preset value signal; and
an optical output portion connecting output signals of the optical output controllers in form of a wired-OR, generating an optical output signal which is an optical input signal controlled based on an output of the wired-OR, and generating the optical output monitoring signal corresponding to the optical output signal;
each optical output controller further comprising a control circuit substantially controlling the input terminal of the integrating circuit to a ground potential when the optical output monitoring signal exceeds the preset value signal.

2. The optical transmission apparatus as claimed in claim 1, wherein the integrating circuit is composed of a feedback circuit including a first resistor and a capacitance, and an operational amplifier having a second and third resistors respectively inputting the optical output monitoring signal and the preset value signal for performing the analog addition with the first resistor.

3. The optical transmission apparatus as claimed in claim 1, wherein the optical output portion is composed of a wired-OR circuit comprising a first and second diodes which respectively input output signals of the first and second optical output controllers to be outputted to a common connection point, an optical variable attenuator generating the optical output signal which is the optical input signal attenuated corresponding to the output signal of the common connection point, and a monitoring portion generating the optical output monitoring signal from the optical output signal generated from the optical variable attenuator.

4. The optical transmission apparatus as claimed in claim 1, wherein each control circuit is composed of a comparison controller comparing the optical output monitoring signal with the preset value signal, a switch closed by the comparison controller only when the optical output monitoring signal exceeds the preset value signal, and an impedance circuit which composes a series circuit with the switch and which compulsorily drops the input terminal of the integrating circuit to a ground potential when the switch is closed, and the series circuit of the switch and the impedance circuit is connected in parallel with the feedback circuit.

5. The optical transmission apparatus as claimed in claim 4, wherein the impedance circuit comprises a resistance voltage-dividing circuit connected between an output terminal of the operational amplifier and the ground potential, and a voltage diving point thereof is connected to the switch and is set substantially close to the ground potential.

6. The optical transmission apparatus as claimed in claim 1, wherein the preset value controller has functions of performing a D/A conversion of the output preset value and inverting the value.

* * * * *